United States Patent [19]

Maung et al.

[11] Patent Number: 5,687,091
[45] Date of Patent: Nov. 11, 1997

[54] INTEGRATED ARRANGEMENT FOR MONITORING WITHOUT INTERRUPT PROCESS FLOW BY NOVEL SENSOR ARRANGEMENT WITH UNIQUE DATA PROCESSING SYSTEM

[75] Inventors: Michael A. Maung; Jack F. Moorehead; Gabor L. Sonyey, all of San Diego, Calif.

[73] Assignee: Automatic Control Technologies, San Diego, Calif.

[21] Appl. No.: 482,916

[22] Filed: Jun. 8, 1995

[51] Int. Cl.$^6$ ............................................. G01F 1/00
[52] U.S. Cl. ...................... 364/499; 364/510; 364/134; 336/200
[58] Field of Search ........................... 364/499–503, 364/509, 510, 557, 558, 571.01, 571.03, 131–134, 187; 395/200.8; 210/742, 743, 744, 85, 86; 336/225, 200, 232

[56] References Cited

U.S. PATENT DOCUMENTS

| | | | |
|---|---|---|---|
| 4,080,585 | 3/1978 | Molthen | 336/200 |
| 4,082,994 | 4/1978 | Newton | 324/30 R |
| 4,351,023 | 9/1982 | Richer | 364/187 |
| 4,376,274 | 3/1983 | Smart | 336/183 |
| 4,830,757 | 5/1989 | Lynch et al. | 210/742 |
| 4,959,768 | 9/1990 | Gerhart | 364/187 |
| 5,088,021 | 2/1992 | McLaughlin et al. | 364/187 |
| 5,161,098 | 11/1992 | Balakrishnan | 336/205 |
| 5,179,665 | 1/1993 | Roslund et al. | 395/250 |
| 5,422,014 | 6/1995 | Allen et al. | 210/743 |
| 5,432,911 | 7/1995 | Mura et al. | 395/275 |
| 5,454,095 | 9/1995 | Kraemer et al. | 395/200.08 |
| 5,479,146 | 12/1995 | Herbert | 336/200 |

Primary Examiner—James P. Trammell
Attorney, Agent, or Firm—Gilliam, Duncan, Harms

[57] ABSTRACT

The disclosure is directed to a system for sensing specific properties of a process flow without flow interruption. A plurality of sensors each sensing a different property of the process flow are arranged in close proximity within the process flow. The sensors each produce an electrical output of their monitored property. Magnetic transformers are provided to prevent cross-talk between the sensor's outputs. Data from the sensors is processed and presented for use in controlling the properties of the process flow and for monitoring.

33 Claims, 13 Drawing Sheets

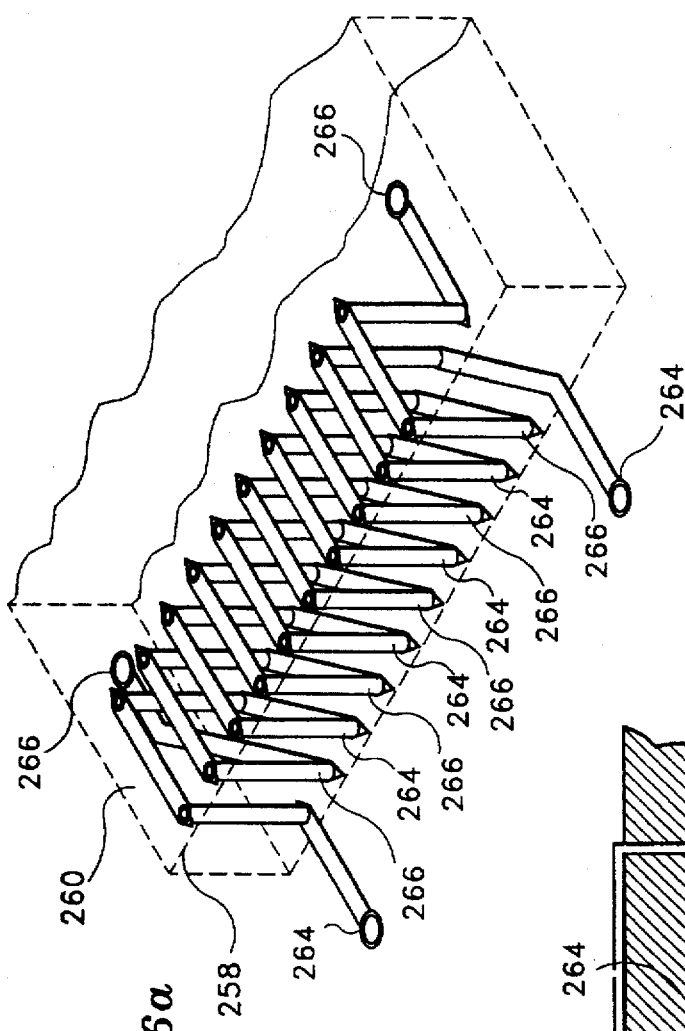
Fig. 6a
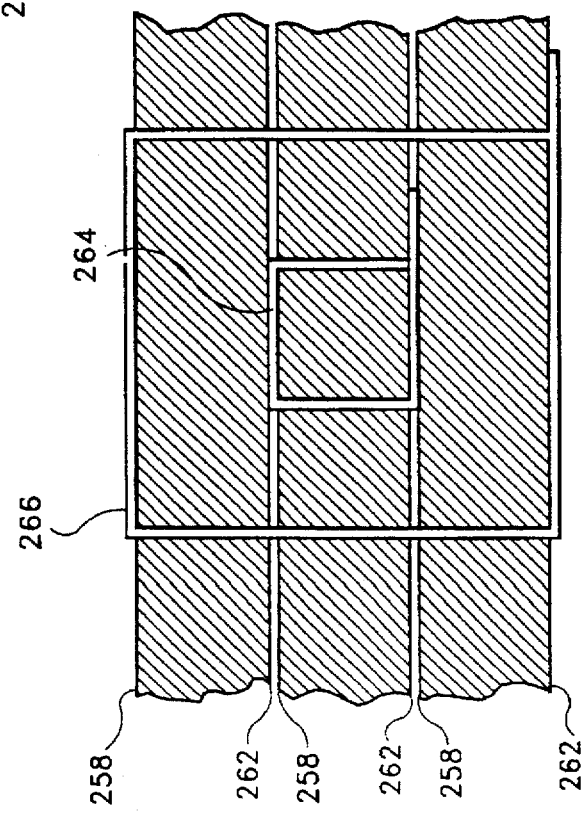
Fig. 6b
Fig. 6c

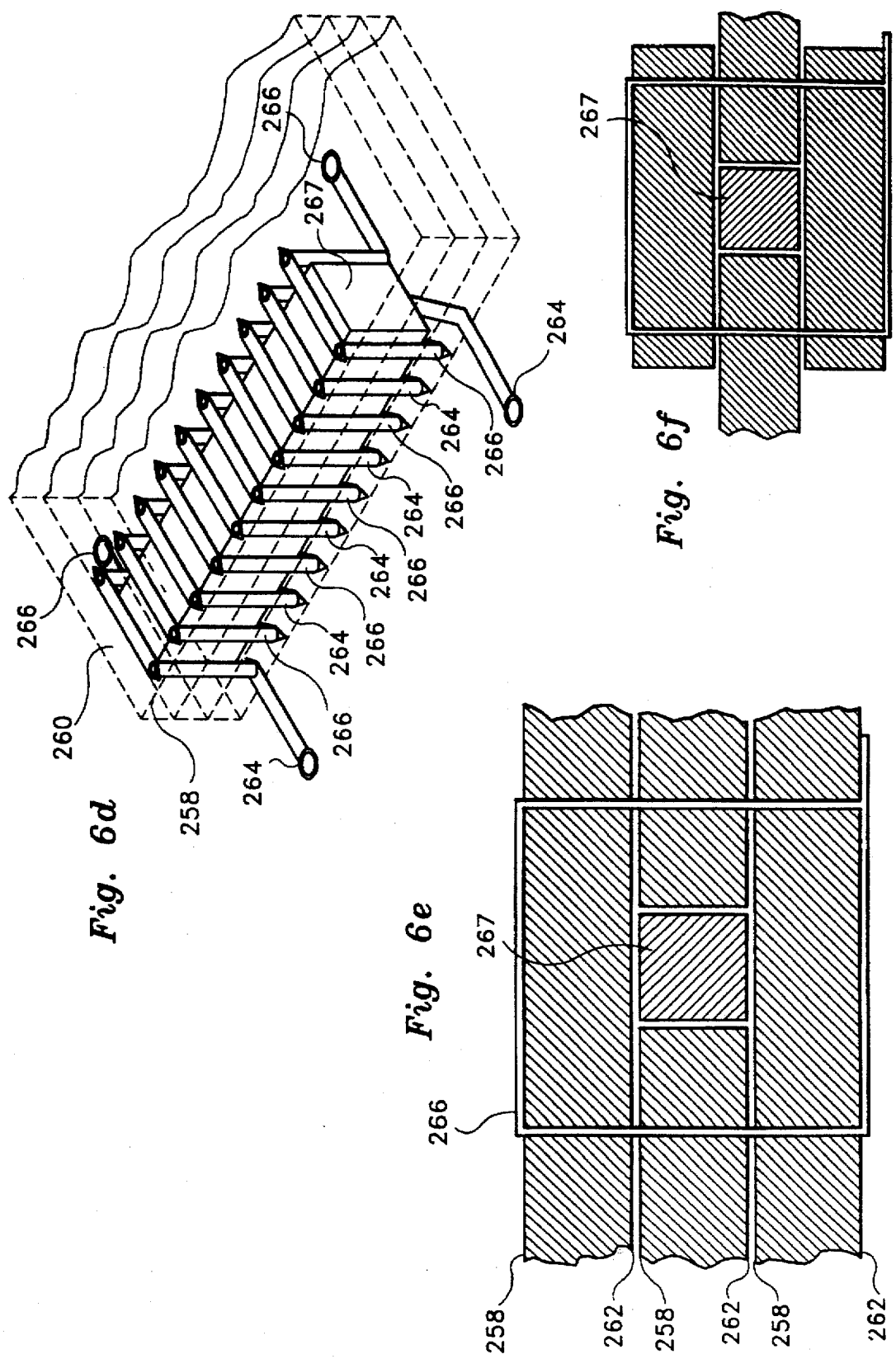

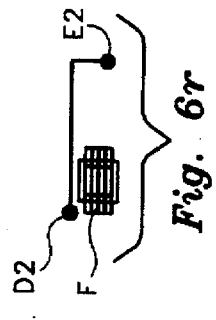
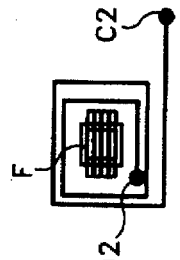
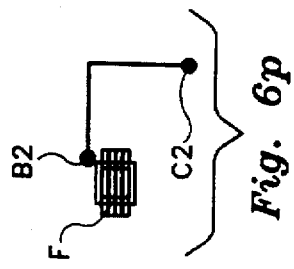
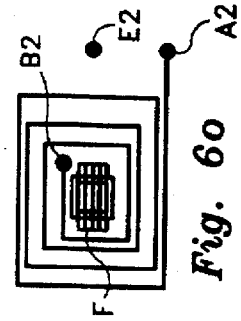
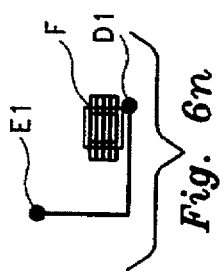
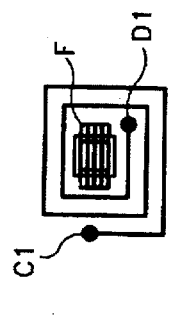
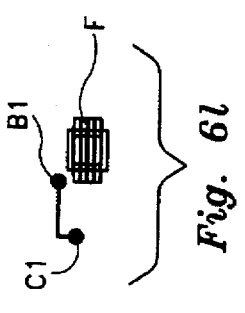
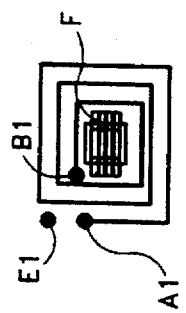
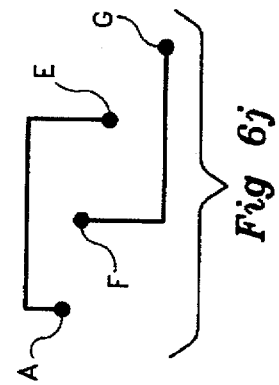
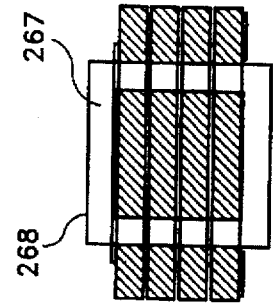
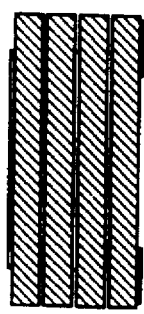
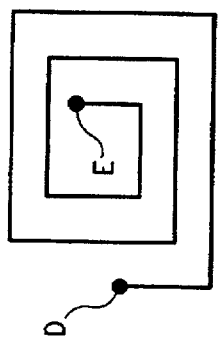
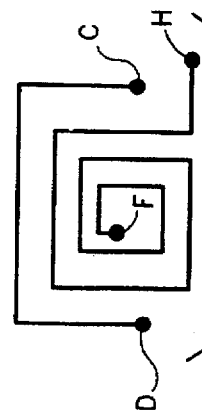
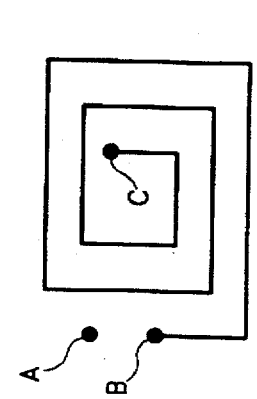

Application Flow Chart 5,687,091

INTEGRATED ARRANGEMENT FOR MONITORING WITHOUT INTERRUPT PROCESS FLOW BY NOVEL SENSOR ARRANGEMENT WITH UNIQUE DATA PROCESSING SYSTEM

FIELD OF THE INVENTION

This invention relates generally to the field of process control and more particularly, but not by way of limitation, to an improvement in the monitoring without interrupt process flow by a novel sensor arrangement with a unique data processing system.

BACKGROUND OF THE INVENTION

In the field of process control it is highly desirable to be able to install quickly and operate a system which will monitor the process with a high degree of accuracy and which operates without interruption. For example, the water industry requires many parameters of the process for cleaning and purifying the water for waste water reclamation or potable water be monitored. It is common to provide sensors for monitoring physical properties of the water such as temperature, conductivity (total dissolved solids), ph, oxidation reduction potential (Redox), chlorine, turbidity, particle count, alkalinity, hardness, differential filter pressure drop and ozone concentration. In addition, other such parameters that are external to the process flow itself must be monitored such as whether the electric power supply is still being provided to each component of the system and whether all interfaces and digital processing system components are properly functioning. The digital output, analog voltage or current output must be controlled. Also, provision must be made for immediate corrective action to be taken in the event of any one of multiple emergency conditions occurring.

The present state of the art for control of such processes generally contemplates that installation of a control system for a certain process involves the efforts of a control engineering with systems integration experience consultant who determines the various parameters to be monitored and the specifications for the various instruments to be acquired to conduct such monitoring. Such instruments are commonly purchased as separate and unique pieces to monitor, calibrate, and maintain on an individual basis. Thus, it would be highly desirable to be able to integrate all of the sensors into one system with certain sensors being grouped in close proximity to each other and coupled through single modules to a data processing system. Consolidating groups of sensors into arrays associated with a single module will enable the quick and efficient calibration of such sensors.

While the need for an integrated control and measurement system as provided by the instant invention has immediate application to the water treatment industry, it also can be applied to many other industries which presently rely on similar sets of costly individual measurement and control units. Major industrial processes including fuel oil and coal burning power generation, steam injection oil drilling, paper pulp processing, food processing and others would be typical examples of processes benefiting from such system.

Referring again to the immediate application of the water treatment industry for the present invention, it is of extreme importance that the monitoring and control of the water purification process be conducted without interruption. The reason for this is that if the water purification process fails to operate properly for whatever reason such failure must be known immediately to the operator so that immediate corrective action may be taken. For example, failure of water filters will permit such bacteria as Cryptosporidium cysts to pass into the public water system with the attendant contamination that will result in severe illnesses or death. Thus, a need exists to provide a monitoring and control system that has extraordinary reliability and which internally continually checks to ensure that all aspects of the system are operating properly and if a problem develops to immediately sense the problem and take corrective action, and/or activate an alarm system.

While such attributes of a monitoring and control system for a process are desirable it is also necessary that such a system be provided on an economical basis. The selection of a data processor and controller for a required system is driven to a significant extent by the selection of the bus architecture. Bus designs such as SCSI, PCI or VESA permit the simultaneous use of multiple master and multiple slave computers but the tradeoff is the added expense of a more elaborate bus. Thus, it would be highly desirable for the data processing system for the instant process control system to be able to use the standard ISA data bus which permits only one master or controller computer to be active.

To further lower the cost of the data processing aspect of a control system it would be desirable to be able to use a readily available commercial motherboard which uses the ISA bus and then be able to couple a plurality of readily obtainable single board computers to the motherboard through the ISA bus. Obviously, in such a system it would also be desirable for the system to provide for continual checking and validation of the proper operation of the system so that in the event of one computer crashing or failing completely that the errant computer be immediately rebooted or the function of that computer be taken over by another computer of the system.

It is thus the objective of the present invention to fulfill the requirements set forth above in a manner which not only fulfills the stringent needs imposed but which does so in a way that is economical and easy to service.

SUMMARY OF THE INVENTION

Briefly stated, the present invention contemplates an arrangement for monitoring and controlling without interrupting specific physical properties of a process flow. The arrangement includes a plurality of sensors that are grouped in close proximity to each other and interposed into the process flow. The outputs of the sensors are suitably isolated from one another. Other sensors and inputs monitor other conditions external to the process flow which may affect the process. The sensors are coupled to modules which condition the sensor outputs and output through a multiplicity of redundant paths to ensure continuity.

A data processing means preferably using a standard ISA bus architecture is coupled to the modules for processing the sensor outputs to control the process and to communicate with a user interface computer. The data processing means also uses a multi port random access memory that may be connected to a plurality of single board computers that are coupled to a suitable motherboard via an ISA bus. The data processing means provides for continual checking and validation of each of the digital computers to confirm that all computers are properly designated functions and in the event of errant behavior of a computer to reboot that computer or to designate another computer to perform its function whether that function was that of the master or slave computer.

Since some of the sensors may be preferably grouped together in a single housing, it is then highly efficient to calibrate such sensors by immersion in one solution rather than calibrating each sensor individually. Also, a unique magnetic transformer design that uses the nonconductive circuit board itself reduces the cost of isolating the sensor outputs from interference and disturbance.

The novel data processing arrangement may also provide for the digital computer positioned on the motherboard to act as the single master or for such computer upon command to remain passive while one of the single board computers coupled to the bus of the motherboard to act as the controller or master computer.

Other features and attendant advantages of the present invention will become apparent to those skilled in the art from a reading of the following detailed description taken in conjunction with the accompanying drawings, in which like numerals refer to like parts.

BRIEF DESCRIPTION OF THE DRAWINGS

FIG. 6A is a perspective of the unique magnetic transformer using a single layer non-conductive circuit board.

FIG. 6B is a fragmentary cross section of FIG. 6A.

FIG. 6C shows the magnetic transformer of the instant invention using multi-layers of circuit boards with the secondary winding interposed within the primary winding.

FIG. 6D is a diagrammatic view showing a multi-layer embedded transformer with a permeability rod core.

FIG. 6E is a cross section of FIG. 6D.

FIG. 6F is a fragmentary cross section of FIG. 6D with soldered pads placed on the top and the bottom.

FIG. 6G is a first layer of a laminated primary winding for a second embodiment of a multi-layer embedded transformer of 6D.

FIG. 6H is a second layer of a laminated primary winding for a second embodiment of a multi-layer embedded transformer of 6D.

FIG. 6I is a third layer of a laminated primary winding for a second embodiment of a multi-layer embedded transformer of 6D.

FIG. 6J is a fourth layer of a laminated primary winding for a second embodiment of a multi-layer embedded transformer of 6D.

FIG. 6K is a first layer of a laminated secondary for a step up transformer of the second embodiment of a multi-layer embedded transformer of 6D.

FIG. 6L is a second layer of a laminated secondary for a step up transformer of the second embodiment of a multi-layer embedded transformer of 6D.1

FIG. 6M is a third layer of a laminated secondary for a step up transformer of the second embodiment of a multi-layer embedded transformer of 6D.

FIG. 6N is a fourth layer of a laminated secondary for a step up transformer of the second embodiment of a multi-layer embedded transformer of 6D.

FIG. 6O is a first layer of a laminated secondary for a step down transformer of the second embodiment of a multi-layer embedded transformer of 6D.

FIG. 6P is a second layer of a laminated secondary for a step down transformer of the second embodiment of a multi-layer embedded transformer of 6D.

FIG. 6Q is a third layer of a laminated secondary for a step down transformer of the second embodiment of a multi-layer embedded transformer of 6D.

FIG. 6R is a forth layer of a laminated secondary for a step down transformer of the second embodiment of a multi-layer embedded transformer of 6D.

FIG. 6S is a section of a horizontal displaced multi-layer transformer 6D.

FIG. 6T is a section of a horizontal displaced multi-layer transformer 6D having a central core.

DESCRIPTION OF THE PREFERRED EMBODIMENT

Figure 1A:
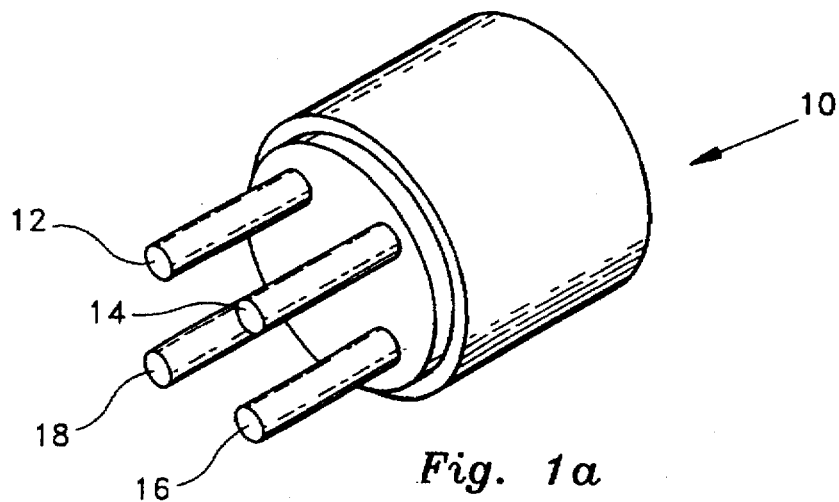
FIG. 1A is a diagrammatic perspective of single housing arranged to carry in close proximity four sensor elements for sensing specific physical quantities of a process flow in accordance with a preferred embodiment of the present invention.
Figures 1B, 2A:
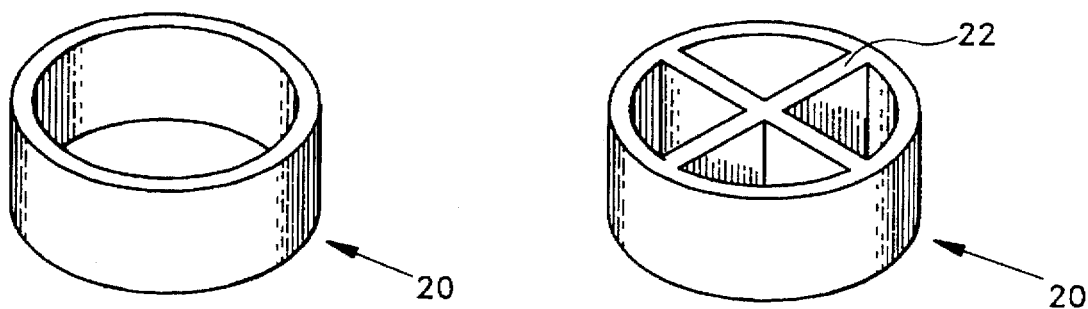
FIG. 1B is a diagrammatic perspective of a single container used to hold a single standard solution for calibration of the sensor elements.
FIG. 2A is a diagrammatic perspective of a single container divided into four separate compartments for holding more than one standard fluid used to calibrate the sensor elements.
Figures 1C, 2B:
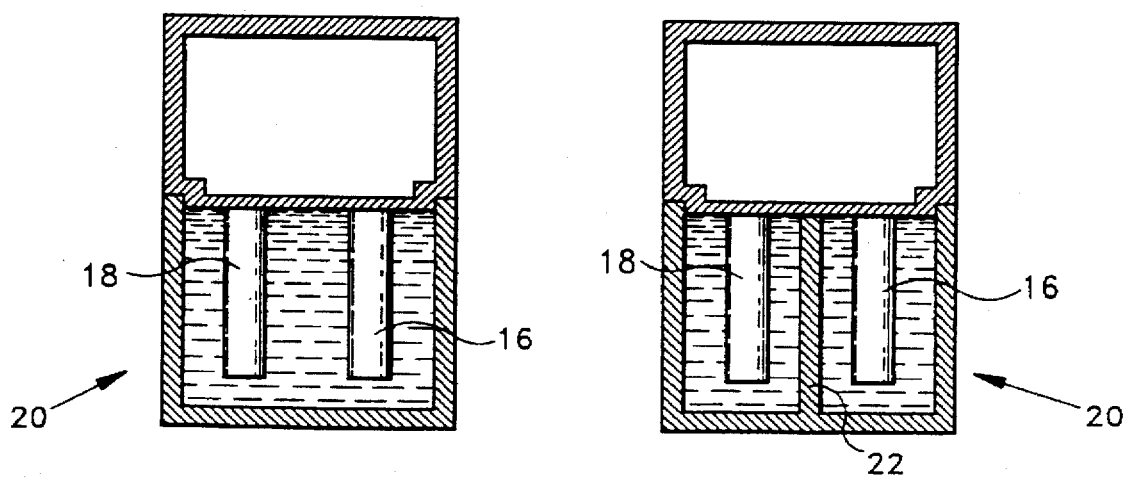
FIG. 1C is a fragmentary cross section of four sensor elements of FIG. 1A immersed in a single standard solution held in the container of FIG. 1B.
FIG. 2B is a fragmentary cross section of the four elements of FIG. 1A immersed in different types of standard fluids held in the container of FIG. 2A.

Referring to the drawings in detail and in particular to FIGS. 1 and 2, the reference character 10 generally denotes a plurality of sensor elements 12, 14, 16, and 18 that are grouped in close proximity to each other and adapted to be interposed into the flow of a process such the purification of water. In the purification and filtration of water it is common to monitor specific physical properties of the water during its treatment to a state suitable for human consumption. Such properties commonly include pH, oxidation reduction potential (Redox), conductivity, temperature, particle counter, turbidity, and chlorine (free or total). The illustrated sensors are considered to be idealized sensors for such application and are not to be considered to be representative of present off the shelf sensors. Thus, sensor 12 may sense pH, sensor 14 sense conductivity, sensor 16 sense temperature, and sensor 18 sense the oxygen reduction potential (REDOX) of the water flow. As seen in FIGS. 1B and 1C the exemplary housing provides a single cavity containing a combined single standard solution for calibrating the sensor elements. Such housing 20, as seen in FIGS. 2A and 2B, may then be provided with a plurality of transverse ribs 22 which separate and isolate different types of standard fluids used to calibrate the sensor elements while yet cooperating with the housing 20 to maintain such elements in close proximity to each other.

Figure 3:
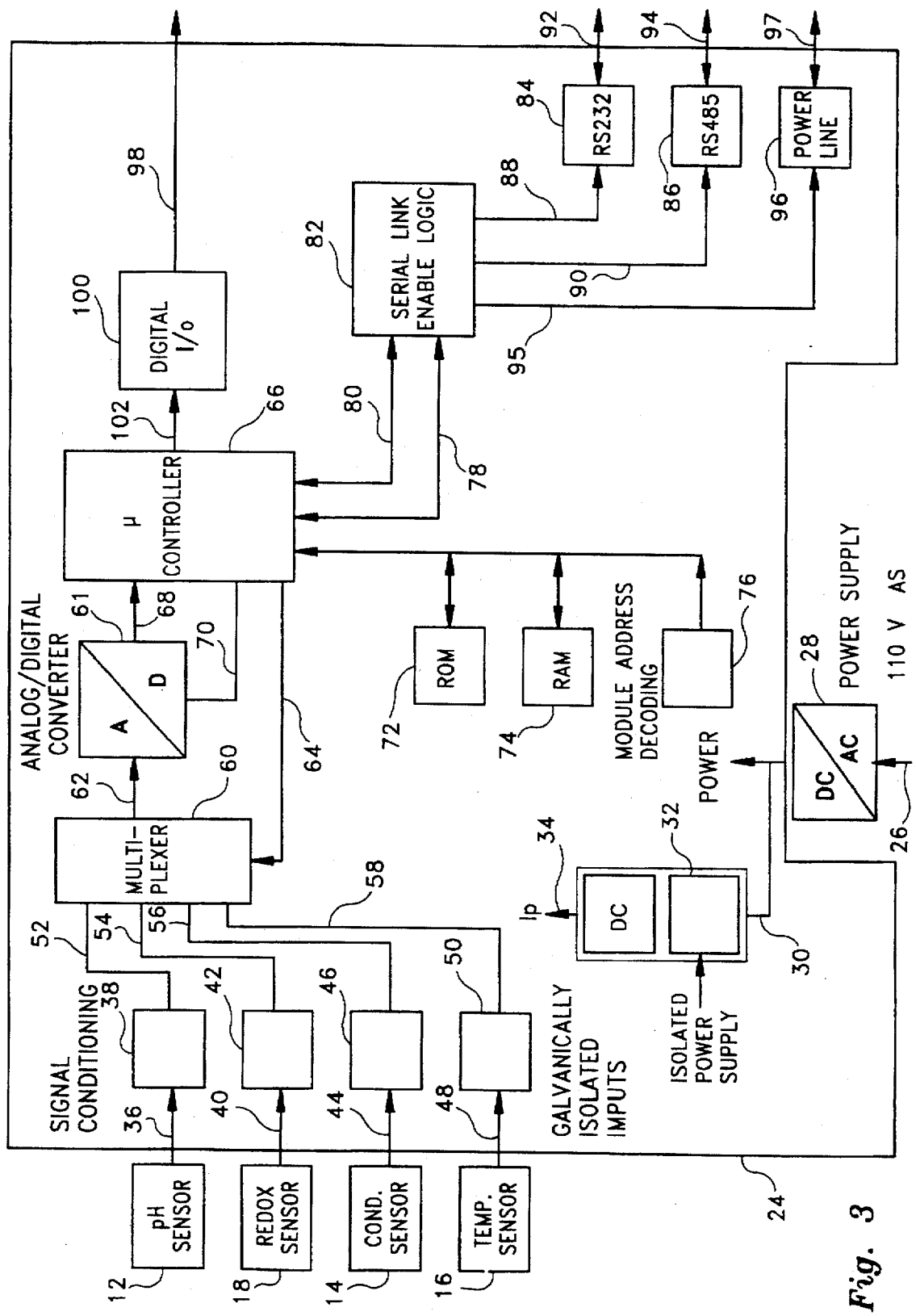
FIG. 3 is a simplified block diagram of a first module which receives sensor inputs and outputs conditioned signals to communication channels.

FIG. 3 shows a module A, identified by reference character 24, is associated with the sensors 12, 14, 16, and 18 shown in FIG. 1. The module 24 is supplied by a source 26 of electrical power, 110 V, 60 cycle AC, that is coupled to a suitable power supply 28 which converts the AC power to DC power that is connected through lead 30 to the module 24 for use as required and to an isolated power supply 32 which provides an isolated source of DC power iP, as is known in the art, on lead 34.

Provision is made for conditioning each of the outputs of the sensors. Thus, the output of sensor 12 is input on lead 36 to a suitable signal conditioner 38 which is supplied input power iP on lead 34 and which acts through suitable isolation amplifiers to isolate the sensor input from intersensor electrical disturbances. As is known in the art, isolated op-amps and DC—DC power supply create a galvanic isolation between the different sensor circuits. Similarly, the output of sensor 18 is input on lead 40 to a similar signal conditioner 42, the output of sensor 14 is input on lead 44 to signal conditioner 46, and the output of sensor 16 in input on lead 48 to signal conditioner 50.

The outputs of signal conditioners 38, 42, 46, and 50 are input on leads 52, 54, 56, and 58 respectively to a suitable multiplexer 60 for being output from the multiplexer 60 on lead 62 in accordance with a control signal appearing on connection 64 from a suitable microcontroller 66.

The output from the multiplexer 60 appearing on lead 62 is input to a suitable analog to digital converter 61 which then outputs the converted digital signal on lead 68 to the microcontroller 66 in accordance with a control signal appearing on connection 70 from the microcontroller 66 to the converter 61. A suitable ROM 72, RAM 74, and module address decoding logic circuitry 76 are suitably coupled to the microcontroller 66.

The output of the microcontroller 66 is output on leads 78 and 80 to suitable serial link enable logic circuitry 82. The circuitry 82 then is coupled to suitable interfaces 84 and 86 by leads 88 and 90 for transmission as requested on outputs 92 and 94. The interface 84 may be the standard RS-232 for transmission and the interface 86 may be the standard RS 485 for conventional twisted wire pair transmission via a serial link as will be described hereinafter in greater detail.

The module 24 is connected by line 95 to a conversion device which converts a digital signal to a radio frequency signal which is imposed on the 110 AC line 97 for transmission of the sensor signals over the power line grid if required. The microcontroller 66 is also provided with suitable control signals on input 98 which is connected to a suitable input/output device 100 that is coupled via lead 102 to the microcontroller 66.

Figure 4:
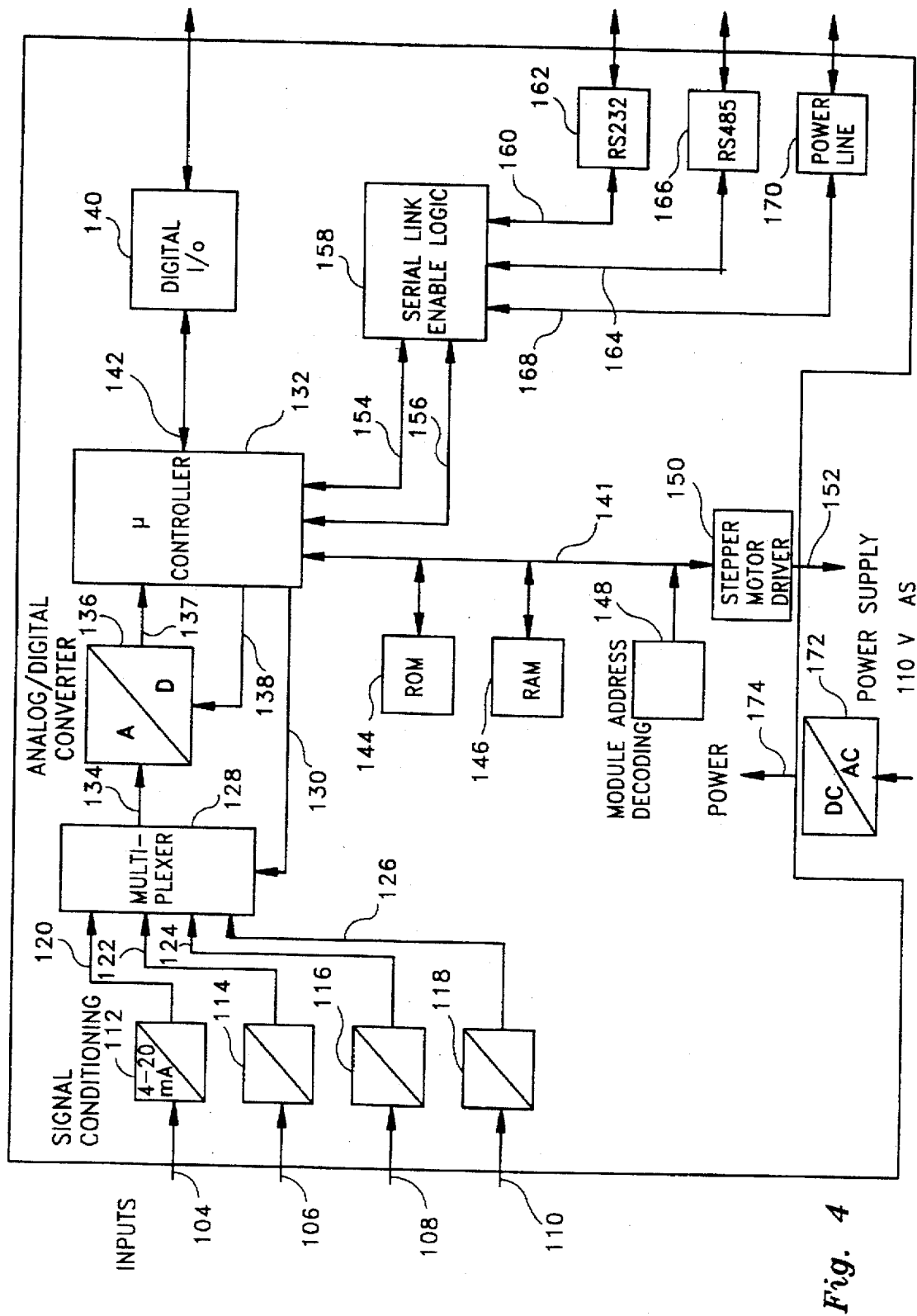
FIG. 4 is a simplified block diagram of another module which receives other sensor inputs.

Referring now to FIG. 4, a second module 102 receives another set of inputs on leads 104, 106, 108, and 110. Such inputs represent the outputs of other sensors that monitor other aspects of process flow. In the instance of water treatments, such other sensor outputs could represent values of such quantities as particle count, turbidity, filter differential pressure, and chlorine (free or total). The inputs from such sensors are then input to suitable signal converters 112, 114, 116, and 118. These signal converters convert the input signals from levels that are typically 4–20 milliamperes to a level of 0–5 volts, with such converted signals appearing on outputs 120, 122, 124, and 126 of converters 112, 114, 116, and 118 respectively. These outputs are then input to a suitable multiplexer 128 which upon a command received on lead 130 from the microcontroller 132 outputs on lead 134 connected to an analog to digital converter 136 an output signal representative of one of the outputs from the other sensors received on inputs 104, 106 108, and 110 to the module 102. The converter 136 then inputs on lead 137 connected to the microcontroller 132 a representative signal from one of the sensor inputs.

The converter 136 is also connected to the microcontroller 132 by lead 138 for control purposes. A suitable digital input/output device 140 is coupled to the microcontroller 132 by lead 142 for communication exterior to the module 102. The microcontroller 132 is connected by a channel 141 to a read only memory 144, a random access memory 146, and module address decoding circuitry 148. The microcontroller 132 also is connected through channel 141 to a stepper motor driver 150 which has an output 152.

The microcontroller 132 is connected through leads 154 and 156 to serial link enable logic circuitry 158. Such circuitry 158 is also connected via lead 160 to a standard interface 162 (RS 232) for communication with a remote station and through lead 164 to a standard interface 166 (RS 485) for hardwired communication. The circuitry 158 is connected by lead 168 to a device 170 for converting digital signals representative of the sensor outputs to radio frequency signals that are imposed on the 110 AC power line for transmission therethrough as may be required. Exterior to the module 102 an AC to DC converter 172 receives 110 AC power and converts that power to suitable DC power which is input on lead 174 to the module 102 for use as required therein.

Figure 5:
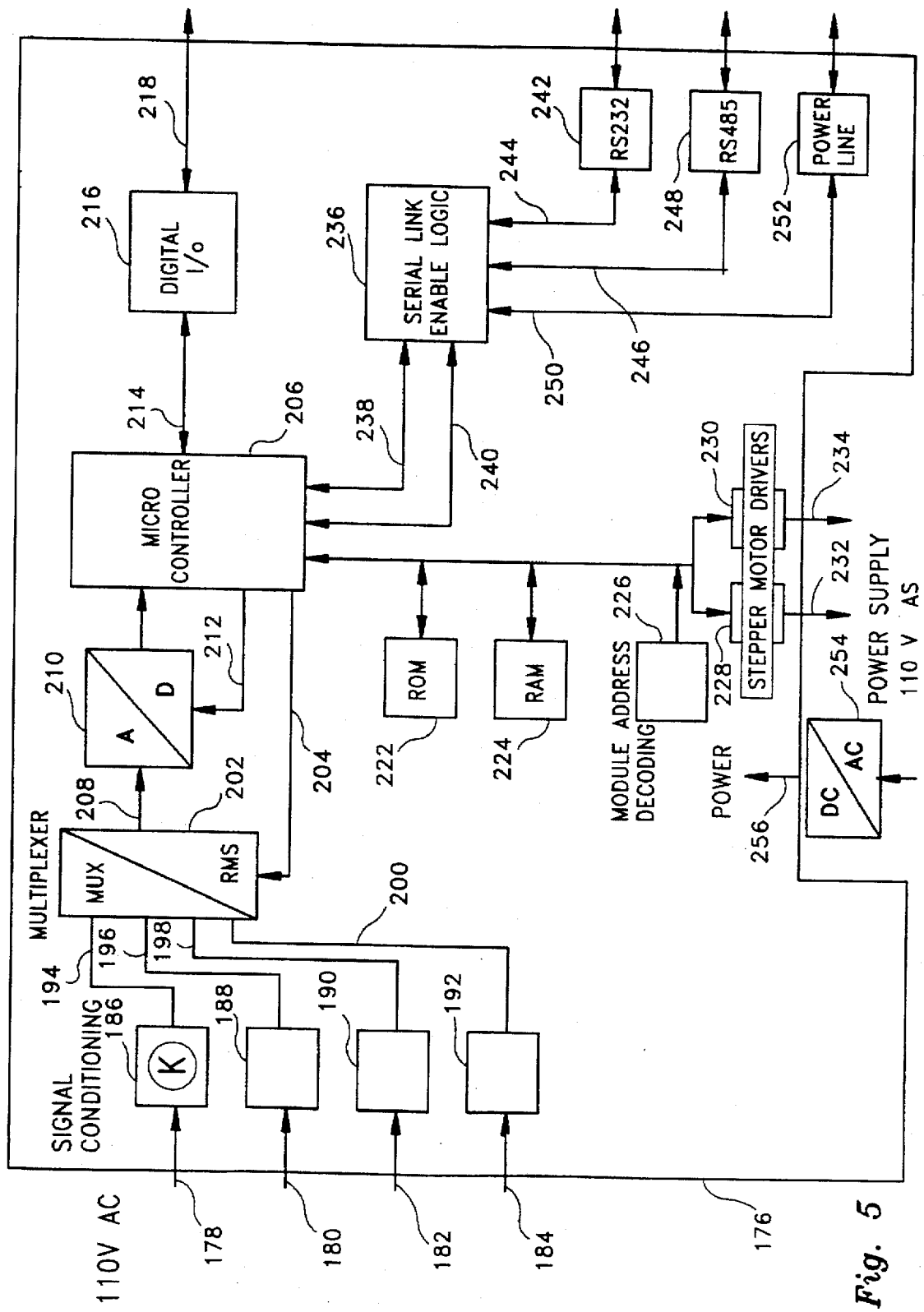
FIG. 5 is a simplified block diagram of yet another module which receives further sensor inputs.

FIG. 5 shows yet another module 176 that is complementary to the previously described modules 24 and 102. While these previously described modules were primarily directed to monitoring specific physical properties that are directly concerned with a process flow, such as water treatment, there are other conditions and properties that may be external to the flow process but with are also directly concerned with the proper operation of the process. It is essential that these other conditions and properties be closely monitored since if one of the were to go awry then the process could fail to operate as desired. Examples such items that require monitoring are devices that control valves, pumps, electronic solenoids and security alarms. In a water treatment facility one would also wish to monitor the AC line (two and three phase) and the voltage control of the ozone generator.

The module 176 may receive inputs from such aforementioned devices and sources on leads 178, 180, 182, and 184. These inputs are connected respectively to suitable signal conditioners 186, 188, 190, and 192. An example of a novel signal conditioner that could be used to advantage for this application will be described in detail hereinafter. As before, the outputs of the signal conditioners are input on leads 194, 196, 198, and 200 to a suitable multiplexer 202 which is controlled through lead 204 connected to a microcontroller 206. The output of the multiplexer 202 appears on lead 208 connected to an AC to DC converter 210 that is controlled through a lead 212 connected to the microcontroller 206. The microcontroller 206 is connected by a lead 214 to a suitable input/output device 216 having a channel 218 for communication exterior to the module 176.

The microcontroller 206 is connected through a suitable channel 220 to a read only memory 222, a random access memory 224, and a module 226 holding address-decoding logic circuitry. The channel 220 also connects the microcontroller 206 to stepper motor drivers 228 and 230 having outputs 232 and 234 respectively. Serial link enable logic circuitry 236 is coupled to the microcontroller 206 through leads 238 and 240. The logic circuitry 236 is also connected to a standard interface 242, such as RS-232, through lead 244 and through lead 246 to another standard interface 248, such as an RS-485. A suitable line 250 couples the logic circuit 236 to a device 252 for converting digital signals to radio frequency signals that may be transmitted over the 110 AC power grid as may be required. Also, 110 AC power is converted by AC to DC converter 254 and provides DC power on lead 256 to the module 176.

Referring now to FIG. 6, a novel arrangement transforming and galvanically isolating an incoming AC voltage to a desired output AC voltage is shown and one which would find particular application for use as a signal conditioner, as previously noted above. In order to reduce the size, weight, and cost of a transformer, a typical electrical non conducting circuit board 258 having opposing parallel surfaces 260 and 262 is provided on one surface with an electrically conducting element 264 which extends along the surface 262 and then transversely to the surface 262 through the board 258 to the opposing surface 260. The conducting element then extends along the surface 260 a predetermined distance and then extends transversely through the board 258 to the opposing layer 262 where it then extends along a predetermined path before again extending transversely through the board 258 again to the opposing surface 260. This traverse is repeated for element 264 as often as required to create a predetermined number of coils of a primary winding of a magnetic transformer. The flow of AC current through the element 264 will create a magnetic field around the element 264.

A similar electrically conductive element 266 is similarly arranged on the circuit board 258 and is spaced a predetermined distance from the path of the conductive element 264 to create a secondary winding, having a predetermined number of coils, of a magnetic transformer. The number of coils of the primary 264 and the secondary 266 as well as the spacing between the coils of the primary 264 and the secondary 266 will determine the voltage induced in the secondary 266 by the magnetic field generated by the AC current flowing through the primary 264.

FIG. 6B is a cross section of the novel magnetic transformer of FIG. 6A that is embedded on a single layer circuit board. FIG. 6C is a cross section of the magnetic transformer that uses three layers of circuit boards with the secondary coil being embedded on only a single layer circuit board and being interposed within the primary coil.

FIG. 6D shows a multi-layer arrangement which is seen to embed a primary coil, the secondary coil with a high permeability rod 267 being inserted longitudinally through the coil to enhance the coupling of the magnetic field provided by AC current passing through the primary coil 264. FIG. 6E illustrates another geometrical illustration of a three layer embedded transformer with a high permeability rod in its center. FIGS. 6G-J show the layers of the primary winding of a four layer embedded transformer and FIGS. 6K-6N show the four circuit layers of the secondary of a step up transformer similar to the showing of FIG. 6D of four layer construction. FIGS. 6O-6R depict cutaway showings of the secondary winding of a four layer horizontal disposed step down transformer transformer which utilizes the primary shown in FIGS. 6G-6J. The various letters and letter number combinations of the various FIGS. 6 et al. teach the interconnections between the layers.

While the coils of the primary and secondary windings of the transformer 268 have been illustrated as extending vertically through the circuit board, it would be within the scope of the invention to provide for such windings to be disposed horizontally on opposing surfaces of the circuit board 258 as shown in FIGS. 6S and 6T FIG. 6S showing a transformer without a core 267 (T) and FIG. 6T shows a transformer having a core 267 (T).

Figure 7:
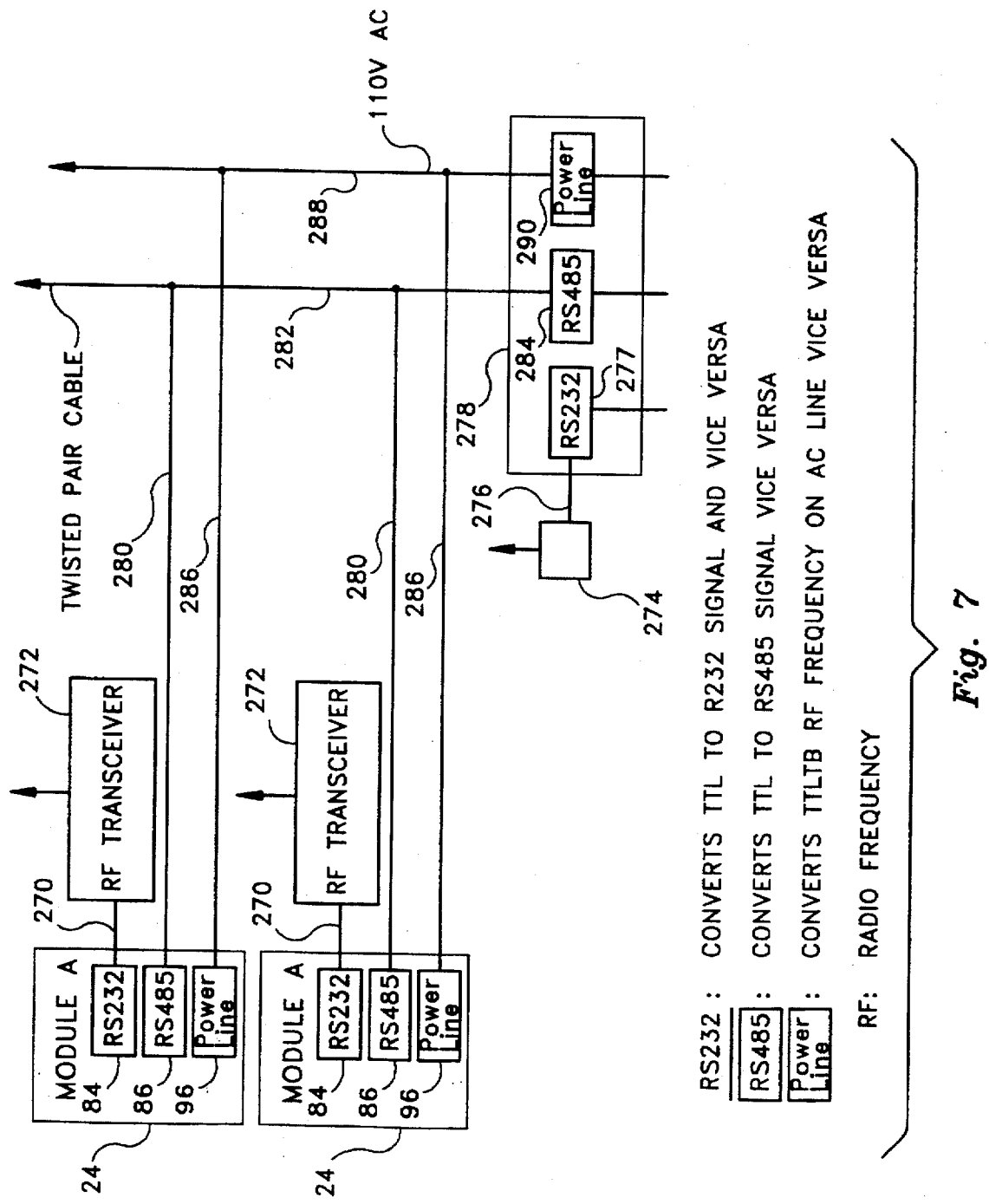
FIG. 7 is a block diagram illustrating a redundant module arrangement to ensure monitoring of process flow without interrupt.

FIG. 7 illustrates how the present invention resolves another problem involved in process control. It is absolutely essential in some processes, such as water treatment, to monitor certain specific physical quantities without any interruption whatsoever. However, a sensor or its associated module or the power supply for a module may fail. The typical solution in the past has been to parallel complete modules with different digital addresses. This also introduces another problem by reducing the number of modules that can be handled on a serial line since the standard interface RS-485 can only handle 32 modules.

As seen in FIG. 7, the instant invention provides parallel identical modules which are provided with the same address. As seen in FIG. 4, the module address decoding circuitry is identified by the reference character 148. For convenience and ease of illustration, the same reference character will be used to identify both the main module and the backup module. As illustrated in FIG. 7, each module 24 is connected through line 270 to a suitable RF transceiver. The interface RS-232 converts the digital logic of the module 24 to a RS-232 signal that is transmitted to the transceiver 272 via lead 270–. Transceiver 272 transmits to or receives data from transceiver 274 which is connected through line 276 to an RS-232 interface 277 for conversion back to a digital signal at the digital processing means 278 as will be described in greater detail hereinafter.

The modules 24 are also connected through lines 280 to a typical twisted pair cable 282. The lines connect the RS-485 interface 86 of each module 24 to the cable 282 which is connected to a RS-485 interface 284 of the data processing means 278 for conversion back to TTL. The device 96 of each module 24 is connected by lines 286 to the 110 AC power grid for transmission of a radio frequency signal as required through the power grid 288 to a similar power line unit 290 provided with the data processing means 278.

In operation the back up or redundant module 24 monitors the data exchange between the data processing means 278 and the main module 24. As soon as the back up module detects that there is no data flow from or to the main module by reason of failure of that module or some other reason, the back up module immediately takes over the task of exchanging data with the data processing means. Since the back up module has the same address as the main module, the data processing means 278 is able to distinguish the data flow from the back up module as having originated there rather than in the main module since the message will have a length that is different from one from the main module. The data processing means 278 will then interchange data with the redundant module to monitor the same conditions.

Figure 8:
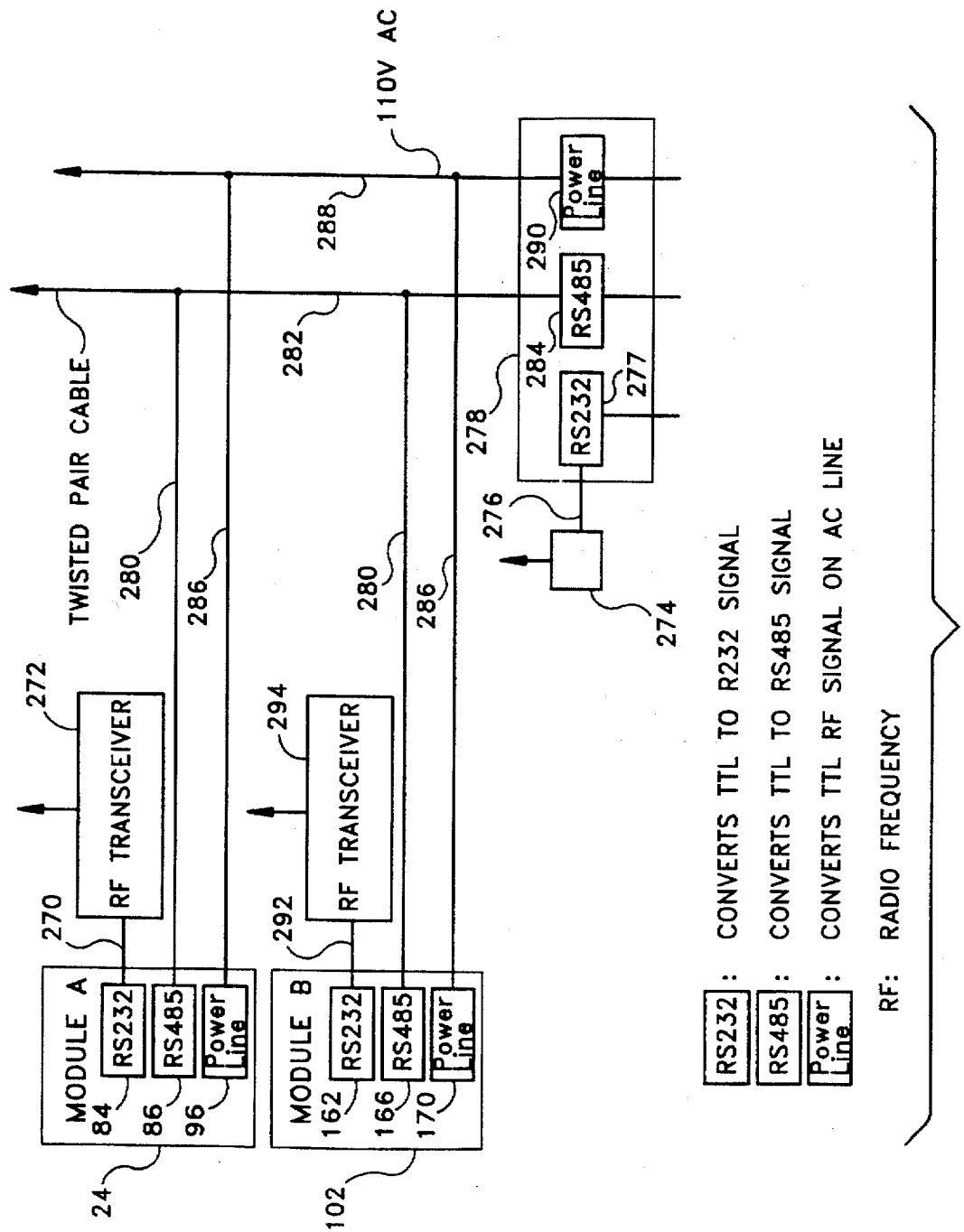
FIG. 8 is a block diagram illustrating a redundant communications link to ensure monitoring of process flow without interrupt.

While FIG. 7 illustrated the aspect of the invention which provides for redundant modules to enable the monitoring and control of a process to continue without interruption even though one of the modules failed, another aspect of the invention contemplates the provision of a redundant serial link from the modules to the data processing means to further preclude the possibility of interruption of the monitoring and control of the process as is seen in FIG. 8.

FIG. 8 is similar to FIG. 7 with respect to the connections involving the module 24. In this instance, the second module 102 has its RS-232 interface 162 connected through lead 292 to a RF transceiver 294 for communication and data interchange through the RF transceiver 274 connected to the data processing means 278. The module 102 is connected to the twisted pair cable 282 by lead 280 connected to the RS-485 interface 166 of the module 102. Similarly, module 102 has its power line device 170 connected to the power grid 288 by line 286 so that the module 102 can exchange information with the data processing means by radio frequency transmission over the 110 AC power grid if required.

Thus, the module 24 and the second module 102 can exchange data with the data processing means 278 over a first common communications channel provided by the twisted pair cable 282, over a second communications channel provided 110v AC power line 288, and over a third communications channel provided by the RF transceivers 272, 294, and 274, if required. Thus, redundancy has been provided for the modules and for the communication channels linking the modules to the data processing means.

Figure 9:
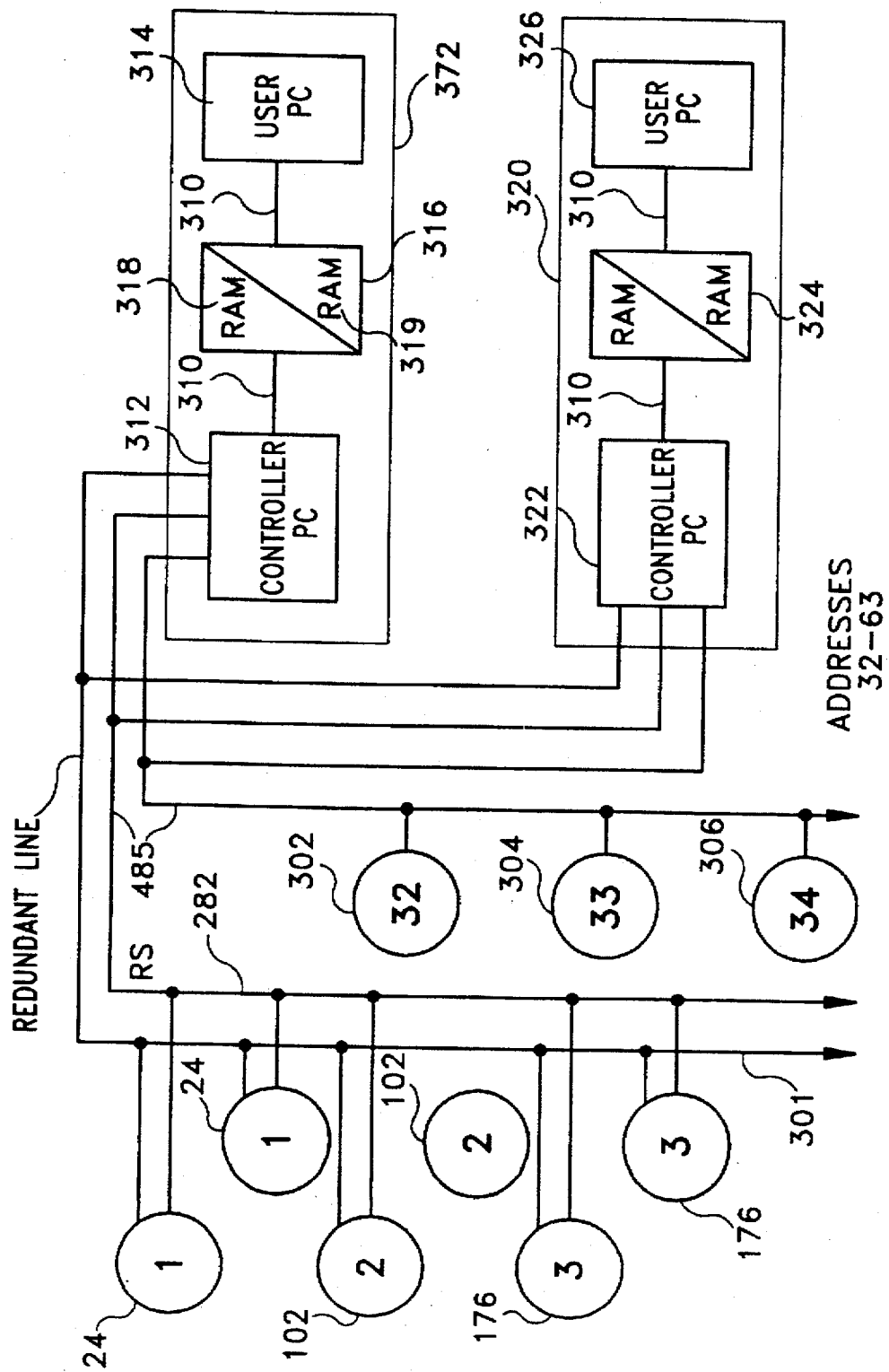
FIG. 9 is a block diagram illustrating a redundant computer arrangement to ensure proper monitoring and control.

Referring now to FIG. 9, it will be seen that the redundant module arrangement and the redundant communication link arrangement with the data processing means is illustrated. While three modules 24, 102 and 176 are shown connected to the twisted pair 282 link, actually an RS-485 interface can accommodate up to 32 modules. Thus, an additional 32 modules can be connected to a second RS-485 link 301 to which exemplary modules 302, 304, and 306 are shown to be connected.

Figure 10:
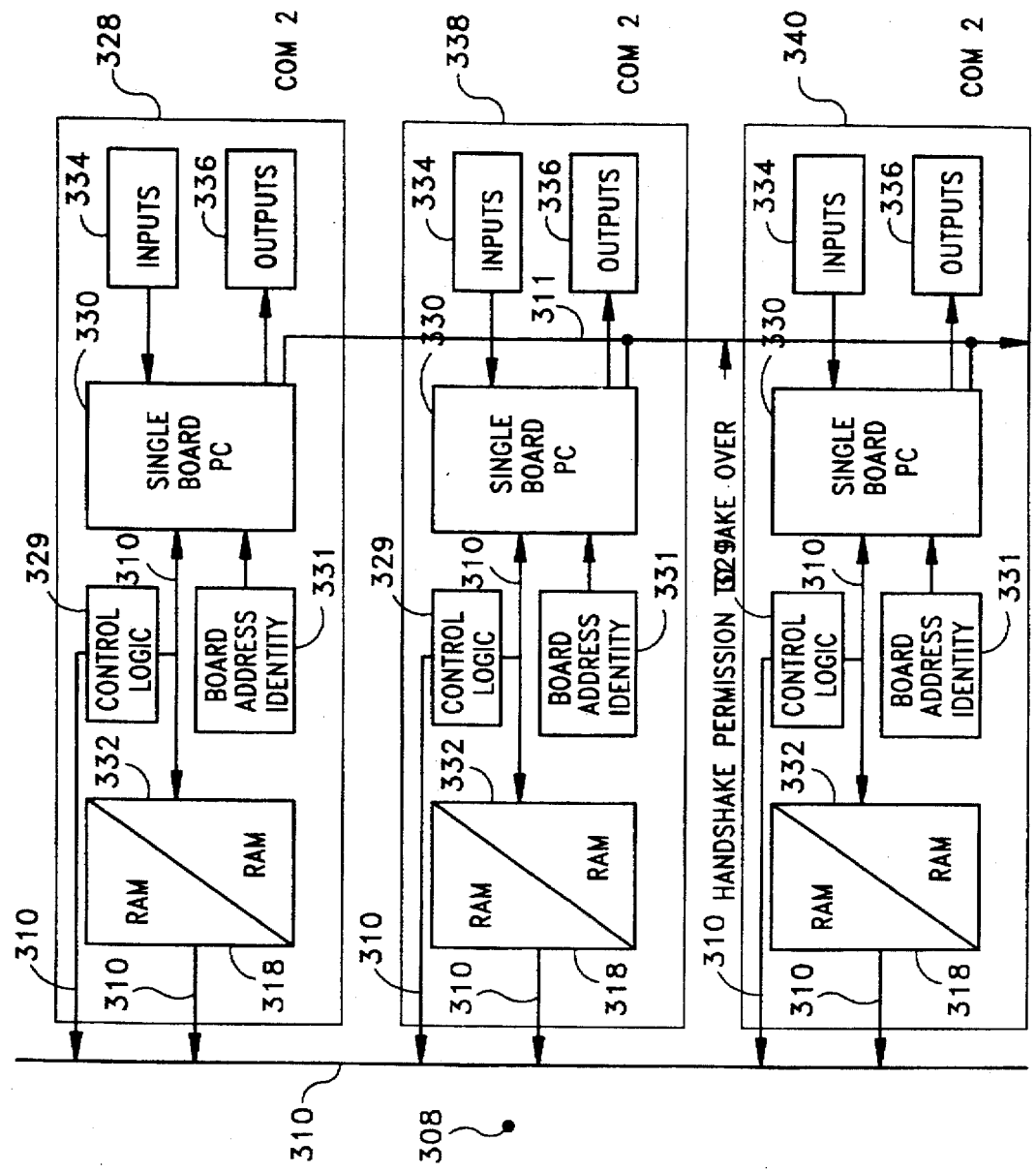
FIG. 10 is a simplified block diagram illustrating single board computers coupled together on an ISA by software/hardware and being individually selectable as the master or slave computer.

The data processing means 278 will now be described in greater detail. A motherboard having a digital computer positioned thereon, as is common in the art, is generally shown in FIG. 10 and is provided with ISA data bus architecture. The motherboard is generally designated by the reference character 308 and the ISA data bus by the character 310. The ISA bus design is different from the interface protocol SCSI, PCI, or VESA buses which couple multiple device masters or slave protocol boards. Also, at present expensive dedicated control computer boards now on the market cannot automatically switch from a dedicated master controller to a passive slave controller.

The data processing means 278 (see FIG. 9) includes a first digital computer 312 and a second digital computer 314 that are each plugged via the ISA bus 310 to a port of a dual port random access memory (DP RAM) 316. The dual port random access memory 316 may be considered to have two sections 318 and 319, each of which holds data identical to that held in the other. The two sections can be considered to be mirror images of each other. When computer 312 writes data via ISA bus into section 318 of the DP RAM 316 that same data is copied into the second section 319 of the DP RAM. With this configuration an IBM compatible computer may be connected through the DP RAM 316 to a MACINTOSH computer.

With the interconnection of the first digital computer 312 though the DP RAM 316 to the second digital computer 314, the two computers can exchange information or data asynchronous and independently from each other. This can happen in a sequence or virtually simultaneously by both digital computers. The DP RAM 316 is linked on one side through the ISA bus 310 to the first digital computer 312 and through the other port on the other side through the ISA bus 310 to the second digital computer 314 as noted. This allows the two digital computers to run at full speed since wait states are not necessary. The physical address of the DP RAM is a common memory segment that exists in both the first and second computers 312 and 314. This type of memory mapping is the same as for any other memory on the digital computer. Further, section 318 of the DP RAM 316 can be mapped to a different location than section 319 of the DP RAM. No special high level software drivers are necessary to access data, yet any data written into one half of the DP RAM 316 by one digital computer can be immediately available on the other section of the DP RAM to the other digital computer. Thus, a unique feature of the data processing means 278 is that the DP RAM 316 is usable by both digital computers with no additional software since its memory location on both digital computers is transparent to both digital computers.

Since ISA bus architecture requires only one computer to be designated as the controller, the first digital computer 312 is designated as the controller and is used to handle all data and control of remote monitor sensors. The controller computer 312 is connected through the DP RAM 316 to the second digital computer 314 which acts as a user interface. The DP RAM 316 is then provided with instructions that prevents the entire system from crashing by automatically rebooting any computer in the system which has crashed and reprogramming any address or control information lost by the crashed computer while it was off-line.

An ISA bus allows only one computer to be the master and all other computers are designated as slaves that are input/output devices that can be slave only, that is they can receive and pass information only when requested by the dedicated controller.

The present invention also contemplates a back up digital processing means 320 for the main digital processing means 278. As before, the back up digital processing means 320 includes a digital computer 322 that is connected by the ISA bus 310 to a second DP RAM 324, which functions the same as the DP RAM 310. A second digital computer 326 is also connected through the ISA bus 310 to the DP RAM 324. Thus, a back up controller computer is provided computer 322 and a back up user interface computer is provided by the computer 326.

It should be noted that any one of computers that is connected through an ISA bus 310 to a DP RAM can become the master controller at any time if required. Thus, this unique design allows the use of a well known bus interface that already exist on a majority of the computers available on the market. Thus an inexpensive computer model consumer duty mother board can be used like a passive back plane without having to obtain an expensive network software license.

This allows the ISA bus computers to function like a more sophisticated industrial type VME bus, but use of the ISA bus architecture eliminates the more expensive VME type busses and their associated special VME application hardware dedicated specifically to a VME bus architecture.

Another aspect of the invention is seen in FIG. 10. In this figure, a first single board computer card 328 is plugged into the motherboard or passive backplane 308 via the ISA bus 310. The card 328 contains a digital computer 330 that is plugged into the ISA bus 310 directly and through the ISA bus 310 to a DP RAM 332, as previously described, which is also coupled to the motherboard 308 through the ISA bus 310. Control logic circuitry 329 is coupled via ISA bus 310 to the motherboard 308 to the single board computer 330 and to the DP RAM 332. Address logic circuitry 331 is connected to the computer 330. The computer 330 is commonly the size of a credit card. The computer 330 is provided with appropriate input/output interfaces 334 and 336 to provide for serial RS-485 interface, real time clock and other digital input/output connections that may be desired in view of the above described redundant arrangements. Other identical single board computer cards 338 and 340 may also be coupled to the motherboard 308 through an ISA bus connection 310 to permit communication therebetween and transmission of a "handshake" signal on 311 for permission to take over as may be required.

Figure 11:
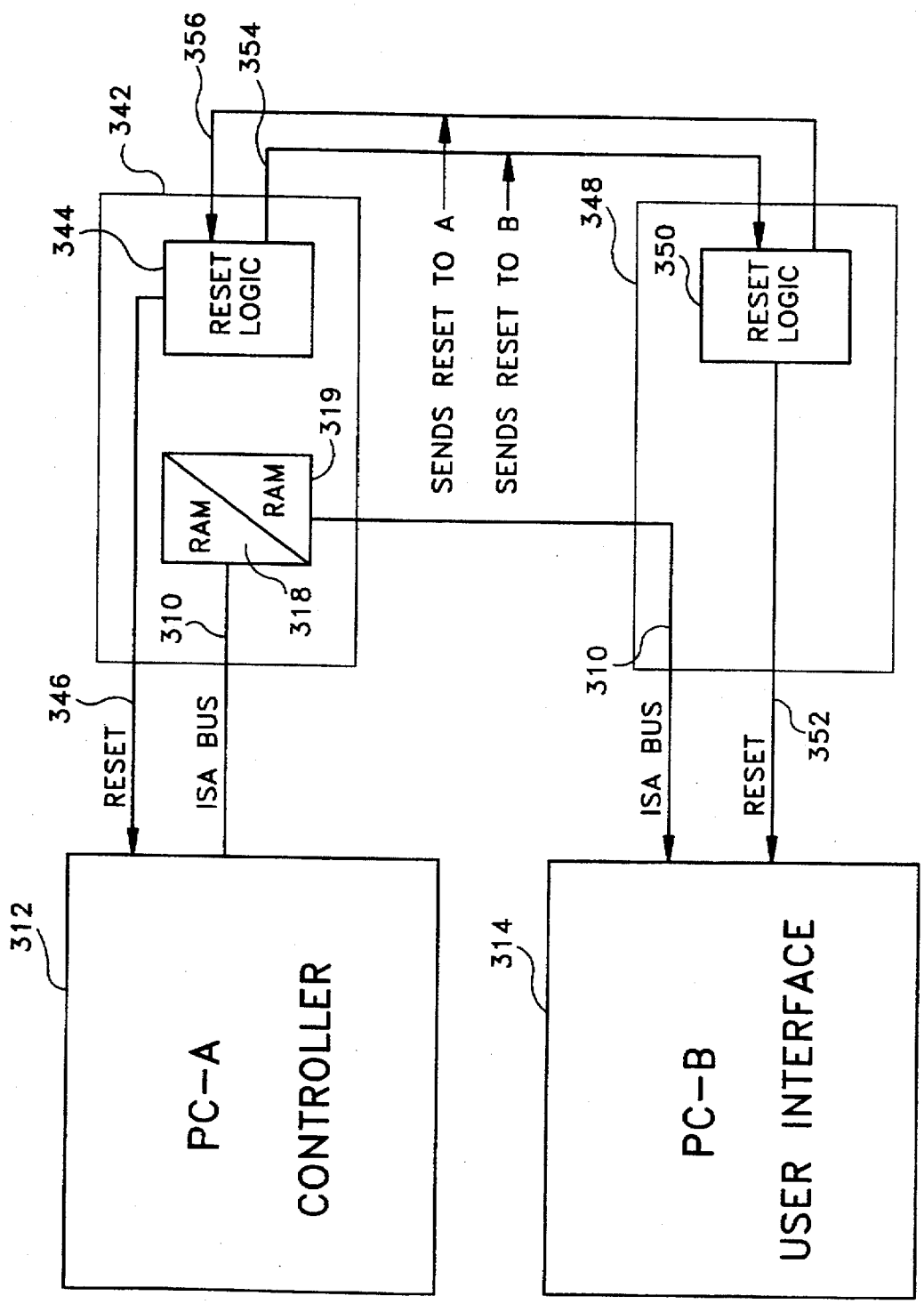
FIG. 11 is a simplified block diagram which illustrates communication between two computers using an ISA bus and the use of certain reset logic by two computers to ensure operation without interruption.

Another feature of the present invention is seen in FIG. 11 which will be explained in the context of the system shown in FIG. 9. As before, the digital computer 312 is coupled to the DP RAM 316 through the ISA bus 310 as is the digital computer 314. The DP RAM is shown as positioned on a board 342 which also contains reset logic circuitry 344 which has a reset line 346 connected to the computer 312.

A second board 348 which may have a DP RAM positioned on it which is not used for the present feature. The board 348 includes reset logic circuitry 350 that is connected by line 352 to the computer 314. The reset logic circuitry 344 on the board 342 and the circuitry 350 on board 348 are also connected by lines 354 and 356.

The problem solved by the present feature is that if a system requires two computers to accomplish a certain task and normally exchange information and if either of the computers hangs up, the entire system is taken down. The present invention provides for a specific location in the DP RAM 316 where the computer 312 can write into and the computer 314 can read from. Similarly, there is another specific location or address in the DP RAM where the computer 314 can write into and computer 312 can read from.

When computer 312 writes certain data into its special address in the DP RAM 316 the computer 314 reads this address and checks whether the data written therein matches a predefined value. If it does, then the computer 314 knows that the computer 312 is up and functioning. However, if the value does not match then the computer 314 asserts a reset command on line 352 to reset logic circuitry 350 that will then send a reset signal to reset logic 344 that will reboot or reset computer 312. After computer 312 is reset it will resume its original task.

Similarly, if the value written into DP RAM 316 by computer 314 were not to check correctly, the reset logic circuitry 344 sends a reset command to logic circuitry 350 on lead 354, the circuitry 350 then asserting a reset instruction to the computer 14 on line 352. Similarly, the reset logic circuitry 350 sends a reset command on line 356 to circuitry 344 which then transmits a reset command to the computer 312 on line 346.

Figure 12:
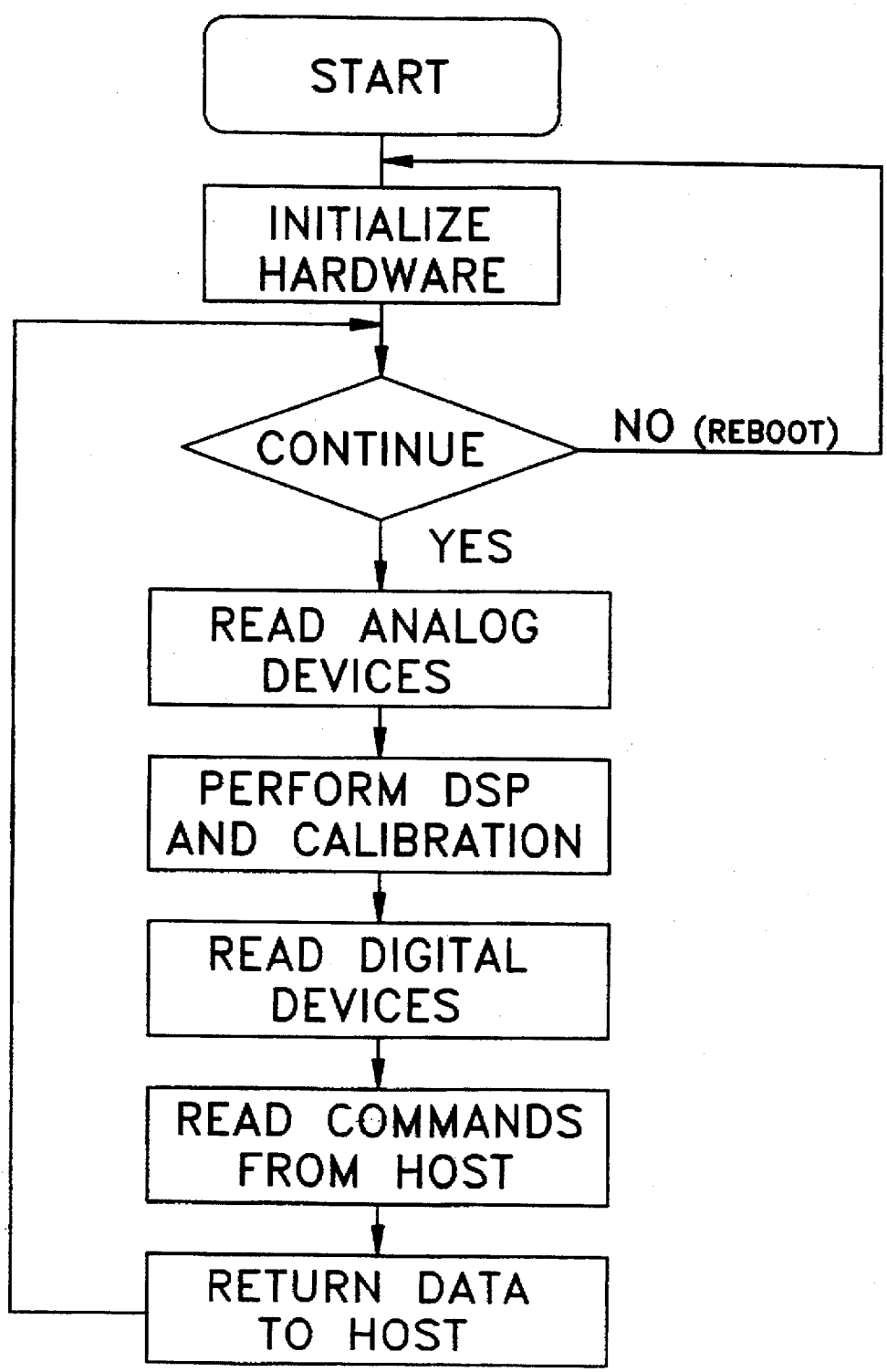
FIG. 12 is a flow chart illustrating the operation of the data processing system for a certain process flow application.

A sample application flow chart for the present invention is shown in FIG. 12. When the application is started the hardware is initialized and then a determination is made whether the hardware has been booted up and is functioning. If the hardware is not functioning properly, the hardware is rebooted. If it is functioning properly, the analog devices are read and then the digital signal processing is performed and the analog devices, which may be the sensors described in FIGS. 1 and 2, are calibrated as will be described hereinafter. The digital devices will then be read and commands from the host or controller computer will be read. The data will then be returned to the host computer and the process of continual monitoring and control of a process will continue without interruption.

Now that all components of the invention have been described, it is now possible to describe the calibration of the sensors 12, 14, 16, and 18. Since these sensors are grouped in close proximity by a housing 10 it is desirable to use one sample solution to calibrate all sensors at one time. A sample solution is chosen that has special characteristics that are required by each one of the individual sensors for calibration. The housing 20 and the contained sensors are then immersed in the single sample solution and the software driven calibration routine is initiated. The software is contained in the ROM of the digital processing means. This software compares values obtained from sensors with the correct known values and appropriate adjustments are made within the mathematical correction segment or the software code. A single point calibration will provide a simple off set, however, if one of the sensors does not read linearly as a value is changed it may be desirable to use a multipoint calibration to provide a regression analysis. Such a calibration procedure is obviously more expeditious than the normal procedure of calibrating each sensor individually in a separate series of solutions. As seen, it would also be within the scope of the invention to use, as seen in FIGS. 1A and 2A, more than one standard solution in the compartmented housing if necessary for some particular calibration routine.

Thus, it is seen that the present invention provides a simple and inexpensive arrangement for monitoring and controlling a process without interruption.

Although the present invention has been shown and described with reference to a particular embodiment, nevertheless, various changes and modifications obvious to one skilled in the art to which the invention pertains are deemed within the purview of the invention.

What is claimed is:

1. An arrangement for sensing specific physical properties of a process flow to be monitored and controlled without interrupt, such properties being direct conditions of the process and properties or conditions exterior to the process that may affect the process, comprising:

a plurality of sensor elements arranged in close proximity to each other and interposed into the flow of the process, each sensor sensing a particular property of the process flow and to provide an electrical output signal representative of such property;

module means coupled to the sensor elements to receive such electrical output signal and having magnetic transformer means to provide insolation sufficient to eliminate ground loop feedback from one sensor output signal to another, and data processing means coupled to the module means for data exchange and for receiving the representative digital signals and processing such signals for monitoring and controlling such process.

2. An arrangement according to claim 1 wherein the sensors are grouped in a single housing.

3. An arrangement according to claim 2 wherein the process is water purification and at least some of the sensors measure specific physical properties relating specially to water.

4. An arrangement according to claim 3 wherein the specific properties being measured include pH, oxidation reduction potential, conductivity, and temperature.

5. An arrangement according to claim 2 wherein the data processing means generates calibration data for sensors positioned in a specific housing while the sensors are positioned in a solution having known specific characteristics.

6. An arrangement according to claim 5 wherein the data processing means generates calibration data for such sensors while they are immersed in such solution and the specific characteristics of such solution are varied whereby the generated calibration data is representative over a predetermined range of values for each property.

7. An arrangement according to claim 1 wherein the module means includes a plurality of modules, each module being provided with sensors, with at least one module having sensors entirely dedicated to monitor physical properties of process and with at least one other module monitoring conditions external to the process but which may affect the process.

8. An arrangement for sensing specific physical properties of a process flow to be monitored and controlled without interrupt, such properties being direct conditions of the process and properties or conditions exterior to the process that may affect the process, comprising:

a plurality of sensor elements arranged in close proximity to each other and interposed into the flow of the process, each sensor sensing a particular property of the process flow and to provide an electrical output signal representative of such property;

module means coupled to the sensor elements to receive such electrical output signal and adapted to isolate galvanically each electrical output signal from the other signals and to provide diaital outputs for such signals, data processing means coupled to the module means for data exchange and for receiving the representative digital signals and processing such signals for monitoring and controlling such process, and an AC voltage coming into the arrangement may have its voltage change by magnetic transformer means which utilize a board supporting the data processing means as the support means for primary and secondary windings positioned thereon.

9. An arrangement according to claim 1 wherein the module means comprises at least one primary module coupled to sensor elements monitoring parameters of the process and at least one back up module coupled to sensor elements monitoring the same parameter of the process, the primary module and the back up module both having the same digital identification and being coupled to a serial data link to the data processing means, the back up module being provided with digital logic circuitry to monitor the data exchange between the primary module and the data processing means and in the event the back up module detects that there is no data flow from the primary module to the data processing means to then commence transmitting data derived from sensor inputs to the data processing means.

10. An arrangement according to claim 9 wherein the data processing means is responsive to data received from the back up module indicating a problem with data provided by the main module and to receive and exchange data thereafter directly with the back up module.

11. An arrangement according to claim 10 wherein the data processing means differentiates messages received from the main and back up modules so that when data is received from the back up module indicating that it has taken over from the primary module, the data processing means will then interchange data and communications directly with the back up module.

12. An arrangement according to claim 8 wherein the sensors are grouped in a single housing.

13. An arrangement according to claim 12 wherein the process is water purification and at least some of the sensors measure specific physical properties relating specially to water.

14. An arrangement according to claim 13 wherein the specific properties being measured include pH, oxidation reduction potential, conductivity, and temperature.

15. An arrangement according to claim 12 wherein the data processing means generates calibration data for sensors positioned in a specific housing while the sensors are positioned in a solution having known specific characteristics.

16. An arrangement according to claim 15 wherein the data processing means generates calibration data for such sensors while they are immersed in such solution and the specific characteristics of such solution are varied whereby the generated calibration data is representative over a predetermined range of values for each property.

17. An arrangement according to claim 8 wherein the module means includes a plurality of modules, each module being provided with sensors, with at least one module having sensors entirely dedicated to monitor physical properties of process and with at least one other module monitoring conditions external to the process but which may affect the process.

18. An arrangement for sensing specific physical properties of a process flow being monitored and controlled without interrupt, such properties being direct conditions of the process and properties exterior to the process but which affect the process, comprising;

a plurality of first sensor elements arranged in close proximity to each other and interposed in the process flow, each sensor element sensing a particular direct physical property of the process flow and providing an electrical output signal representative of a value of such physical property;

a plurality of other sensor elements arranged to sense a physical property associated with the process flow and which may affect the process, each such other sensor element providing an electrical output signal representative of a value of such other physical property;

a plurality of housings adapted to receive groupings of said first sensor elements and to maintain each such grouping in close proximity to each other;

a plurality of modules coupled to groupings of said sensor elements and to the other sensor elements for receiving an electrical out put signal from each sensor element and adapted to isolate galvanically each sensor electrical output signal from another and to provide a digital electrical output signal for each sensor element, said modules being further arranged to provide a first group of primary modules which sense a plurality of physical properties and a second group of back up modules that are paired with the primary modules and which sense the same physical properties as the primary modules, and data processing means coupled to the first group of primary modules and also being coupled to the second group of back up modules for data exchange with each module, which data exchange includes receiving the representative digital output signals and processing such signals for monitoring and controlling the process.

19. An arrangement according to claim 18 wherein each set of paired modules are arranged to monitor the same set of physical properties.

20. An arrangement according to claim 19 wherein each set of paired modules are provided with the same digital address by the data processing means for receiving the same data and the primary module initially interchanges data with the data processing means while the back up module monitors the communication of the primary module with the data processing means and in the event the primary module fails to transmit data properly to the data processing means the back up module disables the primary module and commences transmitting sensor output data to the data processing means.

21. An arrangement according to claim 20 where each module of each set of paired modules is coupled to a radio frequency transceiver for data interchange with a second data processing means that is remote from said data processing means.

22. An arrangement according to claim 20 wherein each module of each set of paired modules is coupled to a first communications channel coupled to the data processing means.

23. An arrangement according to claim 20 wherein each primary module of each set of paired modules is coupled to the first communications channel and each back up module of each set of paired modules is coupled to a second communications coupled to the data processing means.

24. A magnetic transformer particularly adapted for application to a circuit board of a computer for transforming a first alternating current voltage, comprising:

a non-conductive circuit board having opposing surfaces and an area free from the positioning thereon of electronic components;

a first electrical conductor element that is secured to a first surface of the circuit board that is free of electronic components and which extends transversely through the circuit board to the other opposing surface, extends along such opposing layer a predetermined distance, and then extends through the circuit board to the first surface;

means to cause an AC electrical current flow having a predetermined voltage through the first electrical conductor to generate a magnetic field, and a second electrical conductor element that is secured to a first surface of the circuit board a predetermined distance from and parallel to said conductor element and extends transversely through the circuit board parallel to the first conductor, extends along such opposing layer a predetermined distance spaced from and parallel to the first conductor, and then extends through the circuit board to the first surface, whereby the magnetic field generated by the electrical current flowing through the first conductor induces an electrical current having a predetermined second alternating current voltage to flow through the second electrical conductor element.

25. A magnetic transformer according to claim 24 wherein the first conductor element extends through the non-conductive circuit board a number of times to create the primary winding of a magnetic transformer and the second conductor element extends also through the circuit board a predetermined number of times to create the secondary winding of a magnetic transformer.

26. A magnetic transformer according to claim 24 wherein a plurality of non-conductive circuit boards are layered vertically to provide a support for the primary and secondary windings.

27. A magnetic transformer according to claim 26 wherein the one of the primary and secondary windings is interposed within the other.

28. A magnetic transformer according to claim 26 wherein a high permeability core is positioned longitudinally within the primary and secondary coils to enhance the magnetic coupling thereof.

29. A data processing system comprising:

a motherboard including a first digital computer and having a predetermined data bus architecture which permits only one digital computer coupled thereto to act as a controller;

at least one data processing means positioned on a single circuit board and coupled to the data bus and comprising:

a second digital computer coupled to the data bus;

a multi port random access memory having one port that is coupled to the data bus or the motherboard and having a second port that is coupled to the data bus of the motherboard and to the second digital computer;

input/output means coupled to the second digital computer on the circuit board;

address means coupled to the second digital computer carried on the circuit board to identify the second computer, and instruction means contained in the random access memory that determines whether the first or second digital computer will act as the controller and the other computer will act as the slave computer.

30. A data processing system according to claim 26 wherein the predetermined data bus architecture is an ISA bus.

31. A data processing system according to claim 27 wherein the instruction means instructs the digital computer carried on the motherboard to remain passive while the digital computer performs the master computer function.

32. A data processing system according to claim 27 wherein the instruction means contained in the random access memory is instructed by a command from the input/output means as to the identification of the master computer.

33. A data processing system according to claim 27 wherein a plurality of single card data processing means are coupled to the data bus of the motherboard or backplane, and communication channel means couples each of such multiple single card data processing means of the other single card data processing means.

* * * * *